April 19, 1966 R. A. M. TOËSCA 3,247,406
ELECTROMECHANICAL ENERGY CONVERTING DEVICE
Filed Sept. 26, 1962 2 Sheets-Sheet 1
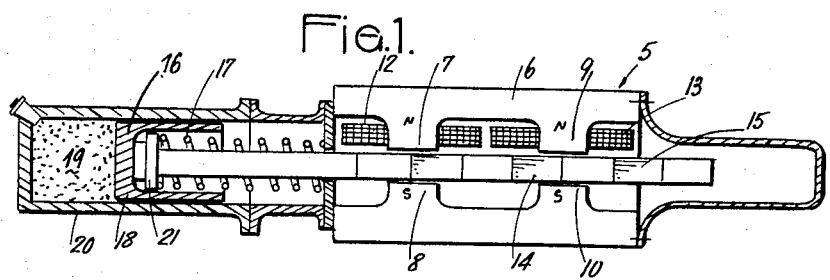
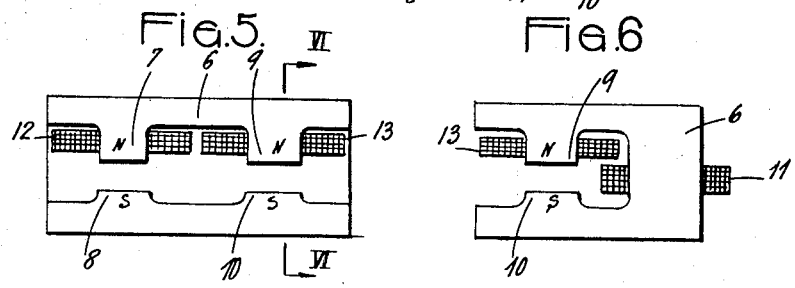
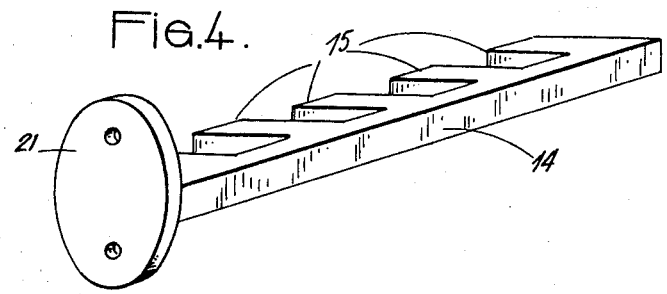
Inventor
René Antoine Michel Toësca
By Alvin Browdy
Attorney April 19, 1966   R. A. M. TOËSCA   3,247,406
ELECTROMECHANICAL ENERGY CONVERTING DEVICE
Filed Sept. 26, 1962   2 Sheets-Sheet 2

Inventor
René Antoine Michel Toësca
By Alvin Browdy
Attorney

United States Patent Office 3,247,406
Patented Apr. 19, 1966

3,247,406
ELECTROMECHANICAL ENERGY CONVERTING DEVICE
René Antoine Michel Toësca, Robin-Dell, R.D. 1, Boyertown, Pa.
Filed Sept. 26, 1962, Ser. No. 226,392
Claims priority, application France, Oct. 3, 1961, 874,919, Patent 1,309,350
7 Claims. (Cl. 310—15)

The present invention relates to an electro-mechanical device for converting energy, and more particularly a generating set whose motive part is preferably constituted by a free piston machine. This device is devised and produced so that its weight in ratio to the electric power unit supplied or absorbed is very distinctly less than that of similar units, like diesel engine generating sets driving a revolving generator, or free piston machines generating gas for supplying a turbine coupled up through reducing gear to a revolving generator, or else a gas turbine associated by means of reducing gear to a revolving generator.

The device forming the object of the invention is also devised and produced so that, in parallel, its aggregate output is better than that of said generating sets or other similar known machines.

According to the invention the device comprises a mechanical energy converter of which at least one of the components is displaced in a reciprocating movement against the action of a gaseous charge for causing the compression of said charge or to absorb its expansion energy, said reciprocating movement component being mechanically connected to a magnetic core forming the mobile armature of a fixed magnetic circuit, this core comprising teeth of which the number is greater than that of the polar parts provided with magnetic circuit windings, so as to cause the reluctance of said polar parts to vary several times during each complete cycle of the component displaced by a reciprocating movement.

According to another characteristic of the invention, the device comprises a free piston machine linked up to a reciprocating generator formed by a fixed magnetic circuit having at least two opposed polar parts of different polarities of which one is associated with an induction coil, on the one hand, and on the other, by a magnetic core integral with at least one mobile assembly of the machine, this core having polar parts arranged between said polar parts of the magnetic circuit so as to cause the reluctance of the latter to vary several times per stroke of the mobile assembly.

Various other characteristics of the invention will moreover be revealed by the detailed description which follows.

Forms of embodiment of the object of the invention are shown, by way of examples, in the attached drawings.

FIGURES 1 to 3 are diagrammatic section of several forms of embodiment of the generating set, according to the invention.

FIGURE 4 is a perspective of an element forming part of the set.

FIGURE 5 is a front elevation of another element forming part of this set.

FIGURE 6 is a section taken along the line VI—VI of FIG. 5.

Figures 2, 3:
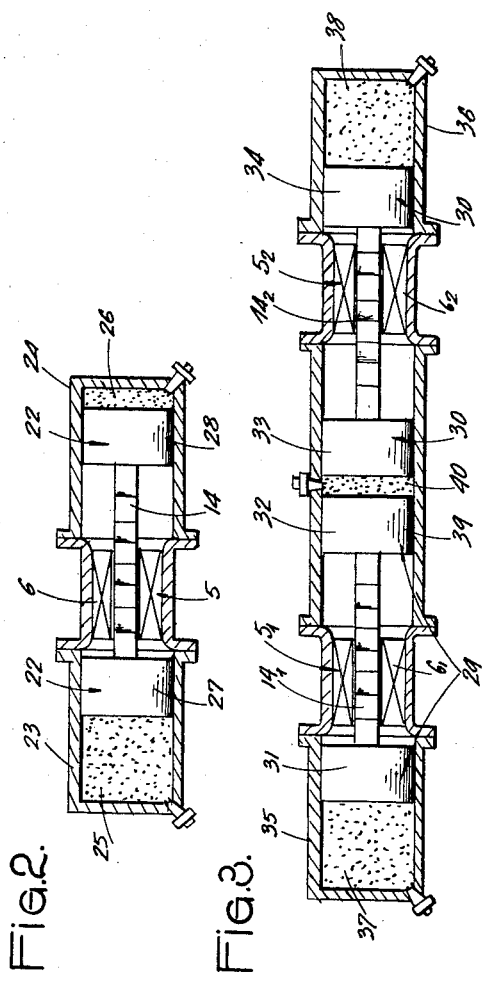

Hereafter there will be described as a device according to the invention, a generating set comprising a free piston machine known in its principle and in its multiple embodiments, able to comprise one or more mobile assemblies, with or without a return-stroke element such as pneumatic cushions, elastic component, hydraulic device etc.

The free piston machine can be cooled by air or by a liquid, it can be supplied by vaporizing or by injection with a liquid, volatile or heavy fuel, or else with a natural or recuperating gas, or else with a powdered motor-fuel. These various possibilities apply to the forms of embodiment shown, by way of non-restrictive examples, in FIGURES 1 to 3.

The generating set also comprises a generator driven, by a reciprocating rectilinear movement, by the mobile assembly or assemblies of the free piston machine. This generator is formed, as can be seen from FIGURES 1, 4 to 6, by a polarized magnetic circuit 5 comprising, in the form of execution shown, a U-shaped armature 6 (FIG. 6) whose lateral wings have projecting at least one pair of polar pieces opposed: two pairs of pieces 7, 8 and 9, 10 for example. This armature is associated with an excitation winding 11 branched on to a direct current source for tending to cause different polarities to appear on the opposed polar pieces. One, 7, 9 at least of the polar pieces of each pair is surrounded by an induced winding 12, 13. It is quite obvious that the polar pieces 7 to 10 can be replaced by permanent magnets, so that the excitation winding 11 can be suppressed.

The reciprocating generator also comprises a magnetic core 14 (FIG. 4) made integral by all suitable means with the mobile assembly or assemblies of the free piston machine. This core has a comb shape which has projecting teeth 15 placed between the polar pieces 7 and 8, 9 and 10 of the magnetic circuit 5, with an airgap reduced to a minimum. The teeth 15 are intended to cause the reluctance of said magnetic circuit to vary several times per stroke of the mobile assembly or assemblies. This means that the frequency of variation of the magnetic flux, and hence, the frequency of the current induced in the windings 12, 13 is a multiple of the frequency of the mechanical oscillations of the mobile assembly or assemblies. The frequency multiplier coefficient is then equal to double (up stroke, down stroke) of the number of teeth of the core 14. It is noticed that this phenomenon enables the weight of the generator to be lowered in a proportion appreciably equal to this coefficient: this is an essential advantage of the object of the invention.

It may be conceived that the magnetic circuit 6 is not polarized but that the core 14 becomes polarized, by replacing the teeth 15 by permanent magnets whose lines of induction are directed parallel to the axe of the polar pieces.

FIGURE 1 shows a generating set whose generator 5 is linked up to a free piston machine comprising a single mobile assembly 16 cooperating with a return element 17. The latter is formed by a helical spring acting on a piston 18 of the mobile assembly, in opposition to the action exerted by the combustion gases periodically burnt in a chamber 19 confined by a cylinder 20 and this piston. The core 14 of the generator in this example is fixed by the intermediary of plate 21 with which it is integral on said piston 17.

FIGURE 2 shows a generating set whose generator is linked up to a free piston machine comprising a single mobile assembly 22 without the return element. This machine comprising two cylinders 23, 24 confining two combustion chambers 25, 26 for selective actuating, sometimes in one direction, sometimes in the other, of two pistons 27, 28 rigidly connected by the core 14 of the generator. In this case, the magnetic circuit 6 is interposed between the cylinders.

FIGURE 3 shows a generating set whose free piston machine comprises two mobile coaxial assemblies 29, 30 without return element. The latter are formed by two pistons 31 and 32, 33 and 34 respectively, connected by the core $14_1$, or $14_2$ of the generator $5_1$ or $5_2$ which is associated with them. The magnetic circuits 6₁, 6₂ of the two generators 5₁, 5₂ are interposed between the end cylinders 35, 36, confining the combustion chambers 37, 38 for actuating pistons 31, 34, and an intermediate cylinder 39, confining a combustion chamber 40 for simultaneously actuating pistons 32, 33 in opposition.

This device is applicable to single phase or to the production of multiphased currents.

In the foregoing, it has been considered that the machine would work as a device producing electric energy. It is obvious that such a machine could also be made for working in a reverse manner and more particularly as a gas compressor, the electric assembly then being the driving element. A machine according to the invention can also be rigorously reversible and work equally well for producing electric energy or for prdoucing air or other gaseous fluids under pressure.

Various modifications can also be applied to the forms of embodiment, shown and described in detail, without going outside of the scope of the invention. In particular, the magnetic core can be driven by a crank-shaft or an eccentric of a connecting rod system of any kind of motive cell, such as a diesel or petrol motor

What I claim is:

1. Electro-mechanical energy converting device, more particularly for producing electric power, comprising a free piston machine having at least one movable piston, a cylinder containing this piston and confining with it a combustion chamber for a fuel product whose combustion causes the displacement of the piston in one direction, elastic elements associated with the piston for ensuring its displacement in the other direction, an armature rigidly connected to said cylinder comprising at least one magnetic circuit, several sets of two polar opposed pieces axially spaced on said armature and separated by an airgap, the airgaps of all the sets of polar pieces being axially aligned, at least one polarization winding for the pieces of said sets on one side of said air-gap, said winding being supplied with direct current and being mounted on the magnetic circuit for polarizing this magnetic circuit so that the opposed polar pieces of each set of opposite polarity the pieces of all sets on one side of said air-gap being of the same polarity, an induced winding mounted on at least one polar piece, a mobile core placed in the airgap of said magnetic circuit and connected to the piston of the free piston machine for sliding with that piston, said core having teeth of magnetic material moving between the polar pieces of this magnetic circuit, the number of these teeth being greater than the number of sets of polar pieces.

2. Electro-mechanical energy converting device, more particularly for producing electric power, comprising a free piston machine having at least one movable piston, a stationary cylinder containing this piston in which said piston is adapted to reciprocate, an armature rigidly connected to said cylinder comprising at least one magnetic circuit several axially spaced sets of two polar opposed pieces on said armature seperated by an air-gap, the air-gaps of all the sets of polar pieces being axially aligned, at least one polarization winding for the pieces of said sets on one side of said air-gap, said winding being supplied with direct current and being mounted on the magnetic circuit for polarizing this magnetic circuit so that the opposed polar pieces of each set of opposite polarity, the pieces of all sets on one side of said air-gap being of the same polarity, and induced winding mounted on at least one polar piece, a mobile core placed in the air-gap of said magnetic circuit and connected to the piston of the free piston machine for sliding with that piston, said core having teeth of magnetic material moving between the polar pieces of this magnetic circuit, the number of these teeth being greater than the number of sets of polar pieces.

3. Electro-mechanical energy converting device, more particularly for producing electric power, comprising a free piston machine having at least one mobile assembly, a stationary cylinder containing said mobile assembly, at least one yoke of magnetic material of a general U-shape rigidly connected to said cylinder, said yoke having several axially spaced sets of two opposed polar pieces extending inwardly from the legs of said U and separated by an air-gap, the air-gaps of all the sets of polar pieces being axially aligned, an induced winding mounted on at least one polar piece of each set of polar pieces, a mobile core of magnetic material connected to said mobile assembly for being displaced in the air-gap separating said polar pieces, said core of magnetic material having a comb shape whose teeth are placed between said opposed polar pieces, and at least one polarization component acting so that said opposed polar pieces are of opposite poparity, the pieces of all sets on one side of said air-gap being of the same polarity.

4. Electro-mechanical energy converting device, more particularly for producing electric power, according to claim 3, comprising permanent polarization magnets.

5. Electro-mechanical energy converting device, more particularly for producing electric power, according to claim 4, in which the permanent magnets are placed in the mobile magnetic core connected to the mobile assembly.

6. Electro-mechanical energy converting device, more particularly for producing electric power, according to claim 4, in which the permanent magnets are placed in the yoke of magnetic material rigidly connected to the cylinder, so that the opposed polar pieces are of opposite polarity.

7. Electro-mechanical energy converting device, more particularly for producing electric power, comprising a reciprocating machine having at least one movable piston, a stationary cylinder containing this piston in which said piston is adapted to reciprocate, an armature rigidly connected to said cylinder comprising at least one magnetic circuit, several sets of two polar opposed pieces axially spaced on said armature and separated by an air-gap, the air-gaps of all the sets of polar pieces being axially aligned, at least one polarization winding for the pieces of all sets on one side of said air-gap, said winding being supplied with direct current and being mounted on the magnetic circuit for polarizing this magnetic circuit so that the opposed polar pieces of each set are of opposite polarity, the pieces of all sets on one side of said air-gap being of the same polarity, and induced winding mounted on at least one polar piece, a mobile core placed in the air-gap of said magnetic circuit and connected to the piston of the reciprocating machine for sliding with that piston, said core having teeth of magnetic material moving between the polar pieces of this magnetic circuit, the number of these teeth being greater than the number of sets of polar pieces.

References Cited by the Examiner

UNITED STATES PATENTS

| | | | |
|---|---|---|---|
| 1,544,010 | 6/1925 | Jordan | 290—1 |
| 1,785,643 | 12/1930 | Noack et al. | |
| 2,362,151 | 11/1944 | Ostenberg | 290—1 |
| 2,829,276 | 4/1958 | Jaret et al. | |
| 2,966,148 | 12/1960 | Jaret et al. | 123—146 |
| 2,992,342 | 7/1961 | Schmidt et al. | 290—1 |
| 3,105,153 | 9/1963 | James | 290—1 |

FOREIGN PATENTS

| | | |
|---|---|---|
| 1,011,664 | 7/1957 | Germany. |

ORIS L. RADER, *Primary Examiner.*

MILTON O. HIRSCHFIELD, *Examiner.*

C. W. DAWSON, *Assistant Examiner.*